United States Patent
Quinn et al.

(10) Patent No.: US 9,011,789 B2
(45) Date of Patent: Apr. 21, 2015

(54) TREATMENT SYSTEM FOR REMOVING HALOGENATED COMPOUNDS FROM CONTAMINATED SOURCES

(71) Applicant: The United States of America as Represented by the Administrator of the National Aeronautics and Space Administration, Washington, DC (US)

(72) Inventors: Jacqueline W. Quinn, Titusville, FL (US); Christian A. Clausen, Chuluota, FL (US); Cherie L. Yestrebsky, Geneva, FL (US)

(73) Assignee: The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 84 days.

(21) Appl. No.: 13/895,717

(22) Filed: May 16, 2013

(65) Prior Publication Data
US 2014/0155676 A1    Jun. 5, 2014

Related U.S. Application Data

(60) Provisional application No. 61/649,002, filed on May 18, 2012.

(51) Int. Cl.
| | |
|---|---|
| *B01J 8/02* | (2006.01) |
| *B01D 11/04* | (2006.01) |
| *C02F 1/28* | (2006.01) |
| *A62D 3/34* | (2007.01) |
| *B01D 71/24* | (2006.01) |
| *B01D 71/42* | (2006.01) |
| *B09C 1/02* | (2006.01) |
| *B09C 1/08* | (2006.01) |
| *C02F 1/44* | (2006.01) |
| *A62D 3/37* | (2007.01) |
| *C02F 1/26* | (2006.01) |
| *C02F 101/36* | (2006.01) |
| *C02F 103/00* | (2006.01) |
| *C02F 103/06* | (2006.01) |

(52) U.S. Cl.
CPC .............. *B01D 11/0415* (2013.01); *A62D 3/37* (2013.01); *B09C 2101/00* (2013.01); *C02F 1/26* (2013.01); *C02F 1/285* (2013.01); *C02F 2101/363* (2013.01); *C02F 2103/007* (2013.01); *C02F 2103/06* (2013.01); *A62D 3/34* (2013.01); *B01D 71/24* (2013.01); *B01D 71/42* (2013.01); *B09C 1/025* (2013.01); *B09C 1/08* (2013.01); *C02F 1/445* (2013.01); *Y10S 588/90* (2013.01); *Y10S 588/901* (2013.01)

(58) Field of Classification Search
USPC ................... 422/211; 588/316, 406, 900, 901
See application file for complete search history.

(56) References Cited

U.S. PATENT DOCUMENTS

| | | |
|---|---|---|
| 3,628,986 A | 12/1971 | Segura |
| 4,430,208 A | 2/1984 | Pytlewski et al. |
| 5,391,300 A | 2/1995 | Webb et al. |
| 6,180,010 B1 | 1/2001 | Alper |
| 6,337,016 B1 | 1/2002 | Alper |
| 6,475,393 B2 | 11/2002 | Alper |
| 6,649,044 B1 | 11/2003 | Bolsing |
| 7,008,964 B2 | 3/2006 | Clausen |
| 7,037,946 B1 | 5/2006 | Reinhart |
| 7,268,269 B2 | 9/2007 | Axtell |
| 7,271,199 B1 | 9/2007 | Quinn |
| 7,692,058 B2 | 4/2010 | Fuhrmann |
| 7,842,639 B2 | 11/2010 | Quinn |
| 8,163,972 B2 | 4/2012 | Quinn |
| 2007/0112243 A1 | 5/2007 | Quinn |
| 2009/0306452 A1 | 12/2009 | Payne |
| 2010/0040789 A1 | 2/2010 | Ito et al. |

FOREIGN PATENT DOCUMENTS

WO    WO 2013/068846    5/2013

*Primary Examiner* — Edward Johnson
(74) *Attorney, Agent, or Firm* — Michelle L. Ford; Jennifer P. Yancy (57) ABSTRACT

A treatment system and a method for removal of at least one halogenated compound, such as PCBs, found in contaminated systems are provided. The treatment system includes a polymer blanket for receiving at least one non-polar solvent. The halogenated compound permeates into or through a wall of the polymer blanket where it is solubilized with at least one non-polar solvent received by said polymer blanket forming a halogenated solvent mixture. This treatment system and method provides for the in situ removal of halogenated compounds from the contaminated system. In one embodiment, the halogenated solvent mixture is subjected to subsequent processes which destroy and/or degrade the halogenated compound.

14 Claims, 1 Drawing Sheet

TREATMENT SYSTEM FOR REMOVING HALOGENATED COMPOUNDS FROM CONTAMINATED SOURCES

CROSS-REFERENCE TO RELATED APPLICATIONS

This application claims the benefit under 35 U.S.C. §119 (e) of U.S. Provisional Patent Application Ser. No. 61/649,002 filed May 18, 2012, the contents of which are incorporated herein by reference.

ORIGIN OF THE INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore.

BACKGROUND OF THE INVENTION

The present invention relates to a treatment system and a method for removal of at least one halogenated compound, such as polychlorinated biphenyls (PCBs), found in contaminated systems. The treatment system includes a polymer blanket that receives at least one non-polar solvent. The at least one halogenated compound permeates into and/or through the polymer blanket and is solubilized with at least one non-polar solvent received by the polymer blanket in situ.

DESCRIPTION OF RELATED ART

PCBs are a family of 209 chemical compounds for which there are no known natural sources. They have a heavy, oil-like consistency (single congeners can exist as solids), high boiling points, a high degree of chemical stability, low flammability, low electrical conductivity, and a specific gravity between 1.20 and 1.44. Because of the above-mentioned characteristic, PCBs were used in a variety of applications such as: heat transfer and hydraulic fluids; dye carriers in carbonless copy paper; plasticizer in paints, adhesives, and caulking compounds; and fillers in investment casting wax. PCBs can volatilize from sources and are capable of resisting low temperature incineration. This makes atmospheric transport the primary mode of global distribution. PCBs are subject to reductive dechlorination, even though they are generally considered recalcitrant in the environment. The process of PCB reductive dechlorination replaces chlorines on the biphenyl ring with hydrogen, reducing the average number of chlorines per biphenyl in the resulting product mixture. This reduction is important because the less chlorinated products are less toxic, have lower bioaccumulation factors, and are more susceptible to aerobic metabolism, including ring opening and mineralization.

Currently, the most common remediation technique is incineration, but this procedure is not without its problems. Incineration requires a large amount of fuel and can lead to the formation of highly toxic by-products, including polychlorinated dibenzo-p-dioxins and polychlorinated dibenzofurans (commonly referred to as dioxins). Another traditional remediation technique for PCB contamination is dredging of contaminated soils and sediments followed by land filling of the resulting hazardous waste. Land filling is undesirable because of the permanent and persistent nature of the PCBs.

Microbial degradation is another treatment option currently being investigated, but slow reaction rates and incomplete degradation have hindered the use of this approach in the field. Two different approaches exist for microbial degradation: aerobic and anaerobic. Aerobic processes proceed via oxidative destruction of the PCBs, although dechlorination is limited to the lighter congeners which have five or less chlorines present on the biphenyl ring. Anaerobic microbial degradation occurs via a reductive dehalogenation pathway which can typically only remove chlorines from the meta and para position.

A more promising technique that has been studied in recent years is the use of zero-valent metals (including magnesium, zinc, and iron) for the in situ remediation of chlorinated compounds including PCBs. Dechlorination of PCBs by zero-valent iron has been demonstrated at high temperatures but at 200° C. or below, little dechlorination of PCBs occurred. However, rates of dechlorination by iron have been increased by using palladium, a known hydrodechlorination catalyst, as a coating on the zero-valent iron surface yielding biphenyl (a non-chlorinated, innocuous product). The rapid degradation of PCB with Fe/Pd has been demonstrated. The Fe/Pd bimetallic system has also been shown to degrade PCBs but the quantification of the degradation was not provided. While the Fe/Pd system has shown high levels of degradation in laboratory studies, the bimetal must be prepared under inert atmosphere after rigorous acid-wash of the iron metal. It has been proposed that the enhanced reactivity of Fe/Pd might be due to the sorption of hydrogen ($H_2$), generated by iron corrosion, on palladium.

SUMMARY OF THE INVENTION

The present invention is directed to a treatment system and a method for removal of at least one halogenated compound, such as PCB, found in contaminated systems. The treatment system includes a polymer blanket that receives at least one non-polar solvent. The at least one halogenated compound permeates into and/or through the polymer blanket and is solubilized with at least one non-polar solvent received by the polymer blanket forming a halogenated solvent mixture in situ.

The method for removal of the halogenated compound, such as PCBs, from the contaminated system includes exposing the contaminated system to the treatment system for a given amount of exposure time. In one embodiment, the polymer blanket includes a hollow interior which receives and contains at least one non-polar solvent which is at least one alcohol, such as ethanol. The PCBs are solubilized with the alcohol forming a halogenated solvent mixture which is subjected to subsequent processing for degrading and/or destroying the halogenated solvent. In one embodiment, the halogenated solvent mixture may be removed from the hollow interior of the polymer blanket for destruction and/or degradation of the PCBs ex situ. The PCBs are drawn to the non-polar solvent due to the increased solubility of PCBs with the at least one non-polar solvent, such as ethanol, over water.

As will become clear, the present invention expands on the concept described in the prior art to effectively remove and remediate halogenated compounds such as PCBs and chlorinated pesticides found in contaminated systems.

In a first embodiment, the treatment system is used for the in-situ removal of halogenated compounds, such as PCBs and chlorinated pesticides, found in natural systems including groundwater, surface water, sediment, and soil. The treatment system has the advantage that it does not negatively alter the natural media, allowing the contaminant to be removed in situ without costly dredging, therefore decreasing the impact of cleanup. Additionally, the treatment system provides no hazardous by-products, which eliminates long-term environmental liabilities, minimizes the potential of leaching or spreading hazardous waste into the environment, and eliminates costly hazardous waste disposal costs.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE INVENTION

The present invention is directed to a treatment system and a method for removal of PCBs found in contaminated systems. The treatment system includes a polymer blanket formed from a polymer which provides for the permeation of at least one halogenated compound into and/or through a wall of the polymer blanket. The at least one halogenated compound permeates into and/or through the wall of the polymer blanket and is solubilized with at least one non-polar solvent received by the polymer blanket forming a halogenated solvent mixture in situ. In a first embodiment of the present invention, the polymer blanket includes a hollow interior receiving and containing at least one non-polar solvent which includes at least one alcohol and/or acidified alcohol, such as ethanol and/or acidified ethanol. In a preferred embodiment, the acidified alcohol is a mixture of an alcohol with an acidifying agent, such as glacial acetic acid. In a second embodiment, the polymer blanket receives the at least one non-polar solvent by soaking the polymer blanket in the at least one non-polar solvent causing the at least one non-polar solvent to permeate into the wall of the polymer blanket. The method for removal of the PCBs from the contaminated system includes exposing the contaminated system to the treatment system for a given amount of exposure time. Once in contact with a contaminated system, the PCBs diffuse into and/or through the wall of the polymer blanket and solubilize with the at least one non-polar solvent forming the halogenated solvent mixture within the polymer blanket. In a first embodiment, the PCBs permeate through the wall of the polymer blanket into the hollow interior receiving and containing the at least one non-polar solvent and form the halogenated solvent mixture within the hollow interior of the polymer blanket. In a second embodiment, the PCBs diffuse into the wall of the polymer blanket and contact at least one non-polar solvent that has permeated into the wall of the polymer blanket and form the halogenated solvent mixture in the walls of the polymer blanket. The halogenated solvent mixture is subjected to subsequent processing which destroys and/or degrades the halogenated compound.

In a first embodiment wherein the polymer blanket includes a hollow interior, the halogenated solvent mixture within the hollow interior of the polymer blanket may be removed and subjected to further processing to destroy and/or degrade the PCBs. Preferably, the PCBs are degraded into benign end-products. In one embodiment, the halogenated solvent mixture may be subjected to a zero-valent metal system for degrading the PCBs ex situ. For example, the halogenated solvent formed in the hollow interior of the polymer blanket may be removed from the polymer blanket and exposed to an acidified ethanol and zero-valent magnesium (Mg) reactant mixture that serves to degrade the PCBs. Upon removal from the treatment system, the PCBs may undergo degradation upon contact with the zero-valent metal system and degrade into non-halogenated end-products. The present treatment system has found particular use in remediating PCB-containing natural media, such as sediment systems, but could also be used in contaminated sludge waste.

In a second embodiment wherein the at least one non-polar solvent permeates into the wall of the polymer blanket, the halogenated solvent mixture may be leached out of the polymer blanket or the polymer blanket containing the halogenated solvent is subjected to other disposal and/or degradation processes. In one embodiment, the halogenated solvent mixture is leached out of the polymer blanket by soaking the polymer blanket in a non-polar leaching solvent. The non-polar leaching solvent may be the same as the at least one non-polar solvent or it may be a different solvent. Preferably, the non-polar leaching solvent is an alcohol, such as ethanol. Once the halogenated solvent has been leached from the polymer blanket, the leached halogenated solvent may be subjected to further processing to destroy and/or degrade the PCBs. Preferably, the PCBs are degraded into benign end-products. In one embodiment, the leached halogenated solvent mixture may be subjected to a zero-valent metal system for degrading the PCBs ex situ as provided previously.

The treatment system is used to remove PCB or other halogenated compounds from contaminated systems. It should be understood that any reference to PCBs in the present application also expressly includes a reference to other suitable halogenated compounds, including, but not limited to, chlorinated pesticides, Chlordane and DDT.

The present invention is directed to a two-phase approach for removing halogenated compounds, such as PCBs, from contaminated systems. The first phase includes the attraction of PCBs from the contaminated system to the surface of the polymer blanket and transportation of the PCBs into and/or through a wall of the polymer blanket. In one embodiment, the PCBs are transported through the wall of the polymer blanket and into a hollow interior of the polymer blanket which contains at least one non-polar solvent which captures the PCBs within the hollow interior of the polymer blanket. In a second embodiment, the PCBs are transported into the wall of the polymer blanket which contains at least one non-polar solvent which captures the PCBs in the wall of the polymer blanket. The second phase includes destruction and/or degradation of the PCBs. In one embodiment of the present invention, the polymer blanket is removed from the contaminated system and subjected to PCB destruction and/or degradation methods. In an alternative embodiment, the PCBs permeate into the hollow interior of the polymer blanket and contact at least one non-polar solvent provided therein to form a halogenated solvent mixture which is pumped from the polymer blanket while the polymer blanket remains in situ. In this embodiment, the halogenated solvent mixture is exposed to PCB destruction and/or degradation methods ex situ of the natural system. For example, the halogenated solvent mixture may be exposed to a zero-valent metal system which degrades the PCB to benign components. In an alternative embodiment, the PCBs permeate into the wall of the polymer blanket and contact at least one non-polar solvent provided therein to form a halogenated solvent mixture. In this embodiment, the polymer blanket is removed from the natural system and the halogenated solvent mixture is leached from the polymer blanket and subjected to further destruction and/or degradation.

Suitable polymers to be used to form the polymer blanket should be capable of allowing for the uptake and transport of PCBs into and/or through a wall of the polymer blanket. Such a polymer must allow the permeation of the PCB contaminants from the contaminated zone as well as assist in the removal of PCBs from the surface of the sediment of the contaminated system, such as a sediment system. For example, various amphiphilic (hydrophobic/hydrophilic ends) biodegradable polymers and co-polymers such as polylactic acid (PLA) and polytheylenimine (PEI) may be used based on their affinity and ability to transport PCBs across their matrix and into a hollow interior containing at least one non-polar solvent. Additional polymers include, but are not limited to, tear-resistant polytetrafluoro-ethylene (PTF), polyvinylchloride (PVC), perfluoroalkoxy (PFA), polyvinylidene fluoride (PVDF), ethylene chlorotrifluoroethylene (ECTFE), polyimides, attapulgite (Attagel®), thermoplastic polyurethanes (Pellathane®), Polyamide 66 (30% glass filed), polystyrene, polyethylene (PE), polypropylene, Nylon 11, polymethylpentene (PMP), fluoroethylene propylene (FEP), propylene-ethylene copolymers (VERSIFY™), conductive polymers (RTP ESD 100), Nylon 12, polydimethylsiloxane, liquid crystal polymers (Vectra® LCP), natural rubbers, nitriles and mixtures thereof.

Zero-valent metal systems for degrading PCBs have been disclosed in U.S. Pat. No. 8,163,972, U.S. Pat. No. 7,842,639, U.S. Pat. No. 7,271,199, U.S. Pat. No. 7,037,946 and U.S. Pat. No. 7,008,964, the contents of which are expressly incorporated herein by reference.

For example, U.S. Pat. No. 8,163,972 discloses a zero-valent metal system for degrading PCBs including zero-valent metal particles, a weak acid, and an organic hydrogen donating solvent for remediating halogenated compounds. Preferably, the organic hydrogen donating solvent contains one or more hydroxyl groups, such as alcohols including diols, triols, ethanol, methanol, and mixtures thereof. In one embodiment, the zero-valent metal particles contain zero-valent iron (Fe) or zero-valent magnesium (Mg). A weak acid is an acid with a PKa value of greater than 2. The weak acid may be selected from, but not limited to, the following weak acids and mixtures thereof: glacial acetic acid, formic acid, propionic acid, lactic acid, and/or other carboxylic acid or aromatic acids. One advantage of this zero-valent metal system having a weak acid present is that no additional catalytic material, such as a noble metal, needs to be coated on the zero-valent metal particles in order to promote the dehalogenation of the PCBs.

In one embodiment of the present invention, PCBs removed from contaminated systems, such as sediments, were subjected to a waste destruction method including zero-valent magnesium, an acidifying agent and environmentally green solvents capable of proton donation. Preferably, the solvent capable of proton donation is an alcohol, including, but not limited to ethanol, methanol, octanol, propanol, butanol and other long-chain alcohols. Most preferably, the solvent is ethanol. A variety of acidifying agents may be used as known to those of skill in the art. Preferably, glacial acetic acid is used as the acidifying agent.

The following Experiment Results are used to illustrate the beneficial results that are obtained using the present treatment system. However, it should be understood by one of ordinary skill in the art that the treatment system may be modified from these preferred embodiments without departing from the scope of the present invention.

Experimental Results

1. Testing for PCB Permeation into Polymer

Testing was conducted to determine suitable polymers to be used in the polymer blanket that are capable of allowing the uptake and transport of PCBs. Initially, polymers were chosen for testing based upon in-house availability. Polymers tested included: Nylon 11, Nylon 12, Vectra LCP, polyethylene (PE), polymethylpentene (TPX), FEP, Versify, RTP ESD 100 (conductive polymer), Pellathane, PA66 (30% glass filled), and polypropylene (PP). These were obtained as beads and initially tested as is. Vials were set-up by placing ~0.20 grams of the polymer being tested in 10 mL of de-ionized water. These were "spiked" to concentrations of ~10 ppm with Aroclor 1260. Extraction and electron capture device (ECD) analysis of the polymer beads after one week allowed for the down-selection of polymers for the next round of tests, which included: RTP ESD 100, PE, FEP, Nylon 11, PA66 and TPX. These polymers were pressed into thin films (~0.015" thick) using a heated carver press. Testing was done to optimize the press conditions (temperature, pressure, and length of time pressed). Several disks of each polymer were produced for further testing.

2. Testing for PCB Permeation Through Polymer

Tests were then setup attempting to determine the permeation rate through a polymer membrane (rather than simply into it, as in the initial tests above) in the following manner. 20 mL septa vials were used, and the septa removed and replaced with a thin disk of the polymer to be tested. The interior of the 20 mL vial was filled with ethanol at a concentration of ~500 ppm (Aroclor 1260) leaving no headspace in the vials. These vials were then placed in an exterior 125 mL Nalgene bottle and filled with either 60 mL of hexane or ethanol. The different solvents were used in an attempt to produce different gradients within the samples. These were allowed to sit for ~2 weeks. Several problems were discovered during the course of this study (e.g., loss of solvent, o-rings used to seal vials coming loose, etc.) which prevented quantification of the samples, but lead to modification of the experimental methods.

A "straw" experiment was devised next, in which straws were used as both a sample vessel and the polymer to be tested (polypropylene). Straws were cut to ~1" length pieces and heat-sealed at one end. ~0.5 mL of 200 ppm Aroclor 1260 was added to the straw and the open end was then heat-sealed. These "straw" sample vessels (in groups of 3) were then placed in a 20 mL vial with 7 mL of ethanol and allowed to sit for several weeks. Analysis of the ethanol showed some PCBs had transported through the "straws," indicating that it was possible for the polypropylene straws to sorb and transport PCBs over time.

3. Testing of Sorptive Capabilities of Several Polymers

The next study was run to test the sorptive capabilities of the other polymers which had been pressed into films (PE, RTP, PA66, Nylon 11, FEP, and PTX) from PCB spiked solutions. Studies were setup by adding 100 μL of 5000 ppm Aroclor 1254 to 20 mL vials and allowing the solvent to evaporate overnight. Small disks of the polymers were cut (using a #9 cork bore) and placed within the vials along with 5 mL of de-ionized water. These were allowed to sit for more than 1 month, and samples were analyzed at several intervals during that time. For the extraction, the polymer disks were removed (and discarded) allowing for extraction of the water layer within the vial (using an equal amount to toluene). Analysis of these samples (after 5 weeks) is shown below in Table 1:

TABLE 1

Analysis after 5 weeks of Polymer Adsorption Study Concentration (ppm)

|  | Peak1 | Peak2 | Peak3 | Peak4 | Peak5 | Peak6 |
|---|---|---|---|---|---|---|
| h2o control 1 | 98.47 | 98.73 | 99.11 | 96.05 | 99.26 | 98.94 |
| h2o control 2 | 101.53 | 101.27 | 100.89 | 103.95 | 100.74 | 101.06 |
| h2o fep1- | 45.46 | 46.17 | 48.31 | 47.38 | 42.10 | 47.36 |
| h2o fep2 | 33.32 | 33.75 | 35.80 | 34.53 | 30.60 | 34.88 |
| h2o nylon 1 | 87.11 | 87.92 | 88.66 | 85.29 | 86.48 | 88.99 |
| h2o nylon2- | 97.36 | 98.09 | 97.79 | 101.09 | 98.10 | 98.40 |
| h2o pa661- | 52.27 | 53.68 | 55.94 | 55.76 | 50.47 | 55.23 |
| h2o pa662- | 80.25 | 81.01 | 82.51 | 84.28 | 79.71 | 83.22 |
| h2o pe1 | 79.09 | 80.10 | 81.66 | 82.90 | 78.45 | 81.56 |
| h2o pe2 | 91.53 | 92.24 | 92.92 | 96.03 | 92.19 | 93.26 |
| h2o rtp1- | 64.16 | 65.04 | 67.58 | 68.19 | 63.11 | 67.78 |
| h2o rtp2 | 75.09 | 75.79 | 77.71 | 78.69 | 73.98 | 77.60 |
| h2o tpx1 | 76.50 | 76.99 | 78.40 | 79.92 | 74.94 | 78.50 |
| h2o tpx2 | 86.09 | 86.50 | 87.14 | 88.95 | 85.05 | 86.62 |

The best results were seen using FEP, which had greater than 50% removal of PCBs from solution in both samples. Other polymers showed less or inconsistent removal levels between the duplicates.

Previous studies have shown that based on initial experiments, it appears that FEP has the highest capacity for removing PCBs from aqueous solutions. Based on these results, the efficacy of FEP to remove PCBs from sediments was tested.

4. Extraction Techniques for Analysis of Sediment Samples

Prior to the beginning of sediment-based experiments it was necessary to determine the most effective extraction technique for analysis of sediment samples. There were two possible extraction methodologies for the sediments themselves (as compared to the extraction of the polymers) which were: 1) the use of ultra-sound and 2) soxhlet-type extractor. Several controls were prepared (via the method discussed below) and were extracted using both methods. The results of these tests showed that both methods were effective in removing PCBs from the surface of the sediments, though the use of ultra-sound produced more precise values (lower standard deviation). However, an experimental difficulty was discovered during the course of these tests in that while dry sediments were easily extracted, it was much more of a challenge to extract wet sediments. The current EPA method for extraction and analysis of contaminated sediments calls for 1:1 ratio of wet sediment to drying agent (i.e. sodium sulfate ($Na_2SO_4$)), however it was determined experimentally that a great deal more was required to thoroughly dry the samples. Our samples seemed to require a ratio closer to 1:8 ratio of sediment to $Na_2SO_4$, which was difficult to accomplish in the limited volume of our sample vials. It was decided at this point to extract and analyze the polymers themselves to determine if any PCBs had migrated from the contaminated sediments. The general procedure for this was to remove/rinse the polymer from the sediment sample and place it into a fresh vial with 10 mL toluene. This was then subjected to 1.5 hours of ultrasound, after which an aliquot of the sample could be set aside for analysis by gas chromatograph-electron capture device (GC-ECD).

5. Effectiveness of FEP to Remove PCBs from Contaminated Sediments

Studies were set up to monitor the effectiveness of FEP to remove PCBs from contaminated sediments. Fresh sediment was collected from the Banana River. Large debris was removed from the sediment by hand and the sieved sediment was allowed to dry overnight (oven temp at 140° C.). The dried sediment was then further sieved using mesh screening to remove additional debris, and approximately 1.3 kg of dried sediment was obtained for further testing. Individual samples made up of ~10 g of dried, sieved sediment in 20 mL vials were prepared. These were spiked with a 200 ppm solution of Aroclor 1254 prepared in acetone (to allow for quicker drying times). Each sample was spiked to incipient wetness with 3.3 mL of this 200 ppm PCB solution and allowed to dry completely. FEP strips (⅝" wide by 5/4" long) were inserted into the sediment until they touched the bottom of the vial. The samples were then brought back to incipient wetness with 3.3 mL of deionized water. Samples were prepared in triplicate and appropriate controls were also made. These were allowed to sit for various amounts of time prior to extraction of the polymers, the results of which are shown below in Table 2:

TABLE 2

Analysis of FEP Polymer Adsorption Study

|  | Peak1 | Peak2 | Peak3 | Peak4 | Peak5 | Peak6 | Average(ppm) | % Removal |
|---|---|---|---|---|---|---|---|---|
| fep4000 | 4.2 | 3.0 | 5.2 | 4.5 | 4.7 | 4.5 | 4.4 | 2.2% |
| fep4001 | 3.9 | 2.5 | 5.2 | 4.5 | 4.4 | 4.6 | 4.2 | 2.1% |
| fep4002 | 4.1 | 3.6 | 5.2 | 4.6 | 4.6 | 4.5 | 4.4 | 2.2% |
| fep5000 | 4.8 | 3.4 | 6.2 | 5.7 | 5.7 | 5.7 | 5.2 | 2.6% |
| fep5001 | 5.2 | 3.7 | 6.6 | 6.0 | 6.0 | 5.9 | 5.6 | 2.8% |
| fep5002 | 4.9 | 3.3 | 5.7 | 5.3 | 5.4 | 5.5 | 5.0 | 2.5% |
| fep6000 | 4.2 | 2.8 | 5.6 | 4.9 | 4.8 | 4.7 | 4.5 | 2.2% |
| fep6001 | 4.7 | 2.3 | 5.6 | 5.0 | 5.1 | 5.0 | 4.6 | 2.3% |
| fep6002 | 4.5 | 2.2 | 5.4 | 4.9 | 5.0 | 5.0 | 4.5 | 2.3% |

As can be seen from the data, the FEP polymer seemed to remove ~1%-2% of the total PCBs (as compared to the analysis of controls). While this seems to be a very low amount of removal, it would seem to correlate with the exposed surface area of the polymer in contact with the contaminated sediment. A second water study was initiated with FEP to determine if the previous study had produced erroneous data. In the initial study, PCBs were deposited in the vial and allowed to evaporate, followed by the addition of the polymer and adding the water last. It is possible that this gave false high sorption data because the FEP was directly in contact with the PCBs (although it didn't for the other polymers run). The second FEP water study was setup differently; the PCBs were spiked in the vial, followed by the addition of the water, and then the polymer was added. Samples were prepared by spiking a vial with 100 µL of 5000 ppm Aroclor 1254 and allowing it to evaporate overnight. 5 mL of water was then added to the vial, and a small piece of the polymer was placed in this solution. After a suitable amount of time, these samples were extracted by removing (and discarding) the polymer and adding 5 mL of toluene to remaining solution. This was shaken by hand to thoroughly mix the resulting solution which was then exposed to ultrasound for 90 minutes. An aliquot of the toluene layer was set aside for analysis by GC-ECD. Two sets of supplicate samples and appropriate controls were prepared and allowed to run for ~1 week and ~2.5 weeks. The data is given below in Table 3:

TABLE 3

Analysis of FEP Polymer Adsorption Study
% Removal

|      | 2 weeks | 3 weeks | 6 weeks |
|------|---------|---------|---------|
| FEP1 | 54%     | 60%     | 27%     |
| FEP2 | 66%     | 50%     | 73%     |

The second round of testing showed that FEP was much more similar to other polymers previously tested than originally thought (from the 1$^{st}$ FEP water study), that is, there was a lower concentration of PCBs that migrated into the polymer from the aqueous solution. Again, this seems to correlate with there being little difference seen between polymers and that the sorption is surface area dependent.

6. Use of Carbon in the Uptake of PCBs

In order to evaluate the data obtained from the initial FEP studies (and to test the idea that the sorption may be directly related to surface area), additional sediment studies were setup to evaluate the use of carbon in the uptake of PCBs. A common material used to sorb environmental contaminants is granular activated carbon (GAC). Two types of carbon were used in these experiments which were on hand in the laboratory: 0.9 mm mechanical pencil lead (68% graphite, 26% clay, and 5% wax) and pure graphite crucibles were used in place of the polymers. 6 pieces of standard sized mechanical pencil lead were used per sample, and half of a graphite crucible was used per sample. These were chosen to closely correspond to the surface area provided by one of the FEP from the previous study. The samples were allowed to sit for 1 week prior to extraction and analysis. The pencil lead and graphite crucibles were removed from each sample and rinsed with deionized water, then placed in 10 mL of toluene (to allow for full submersion) and then exposed to ultrasound for 90 minutes. The samples were centrifuged, and an aliquot of each was set aside for analysis by GC-ECD, the results are shown below in Table 4:

TABLE 4

Comparison of PCB absorption to industry accepted PCB absorber.

|               | Peak1 | Peak2 | Peak3 | Peak4 | Peak5 | Peak6 | Average(ppm) | % Removal |
|---------------|-------|-------|-------|-------|-------|-------|--------------|-----------|
| crucible 1    | 8.0   | 5.9   | 7.4   | 6.3   | 5.8   | 4.8   | 6.4          | 3.2%      |
| crucible 2    | 7.2   | 5.6   | 7.8   | 6.7   | 6.4   | 5.6   | 6.5          | 3.3%      |
| pencil lead 1 | 9.0   | 7.8   | 8.5   | 7.1   | 7.5   |       | 8.0          | 4.0%      |
| pencil lead 2 | 10.1  | 8.7   | 9.7   | 8.7   | 8.8   | 7.8   | 9.0          | 4.5%      |
| pencil lead 3 | 10.8  | 9.4   | 10.0  | 8.9   | 8.9   |       | 9.6          | 4.8%      |

These results were quite similar to those seen when using a FEP polymer with a similar surface area. This could indicate that the removal of PCBs has more to do with the surface area of the sorbent rather than its chemical nature (e.g., hydrophobicity, etc.).

7. Absorptive Capabilities of Additional Polymers

A new water study was setup to analyze the sorptive capabilities of additional polymers including: tear-resistant polytetrafluoroethylene (PTFE), polyvinylchloride (PVC), perfluoroalkoxy (PFA), polyvinylidene fluoride (PVDF), ethylene chlorotrifluoroethylene (ECTFE), polyimides, Attagel®, and polystyrene. These polymers were selected because of their inherent chemical properties and their possible sorption of PCBs. Samples were prepared by spiking a vial with 100 µL of 5000 ppm Aroclor 1254 and allowing it to evaporate overnight. 5 mL of water was then added to the vial, and a small piece of the polymer was placed in this solution. After a suitable amount of time, these samples were extracted by removing (and discharging) the polymer and adding 5 mL of toluene to the remaining solution. This was shaken by hand to thoroughly mix the resulting solution and then exposed to ultrasound for 90 minutes. An aliquot of the toluene layer was set aside for analysis by GC-ECD. The results for this study are shown below in Table 5:

TABLE 5

Summary of Polymer Coupon Adsorption Study
% Removal

| ECTFE | PFA | PVC | PVDF | TR-PTFE | Polystyrene stationary | Polystyrene moved | Attagel stationary | Attagel moved |
|---|---|---|---|---|---|---|---|---|
| 11% | 6% | 7% | 4% | 1% | 2% | 2% | 3% | 3% |

Analysis of these polymer samples (except for the polyimides, seen below) show similar results to that seen in previous water studies, reinforcing the idea that the sorption of PCBs may be based solely on the surface area of the polymers in question. Sediment studies have been setup to further evaluate the attagel and polystyrene polymers. At the time of filing this application these studies are still currently running. The data table does not show any results for the polyimide samples because of analysis problems that occurred during the extraction procedure. The polyimide polymers dissolved to some extent during the extraction process, and caused problems when introduced onto the GC (even after cleanup and centrifugation). It appears that some of these samples will be soluble (to some extent) in toluene, and a different extraction solvent will need to be used in these cases.

8. Use of Electrically Conductive Polymers

The results up to this point in time seem to indicate that the chemical nature of the polymer may not be as important as the surface area that is in direct contact with the PCB contaminated sediments. It may be possible to increase the sorption capability of the polymer matrix by simply increasing the amount of contaminated sediments that the polymer comes into contact with. One possibility is to use electrically conductive polymers (such as Nafion or PVDF) coated with copper electrodes. Power could then be supplied to the electrodes which will induce vibrational movement, increasing the amount of contaminated sediments the polymer comes in contact with.

9. Effect that Surface Contact Between the Polymer and Contaminated Sediments has on the Sorption Rate of the PCBs The next set of vial studies was set up to study the effect that surface contact between the polymer and contaminated sediments had on the sorption rate of the PCBs. This was accomplished by setting up two sets of experiments, a control set in which polymer strips were kept stationary and a mobile set in which the polymers were moved every month over a 3-month period. Multiple polymers were tested including ECTFE, ESD-100, FEP, Nylon 11, PA-66, PE, PFA, PVDF, TPX, PTFE, and PVC and the resulting concentrations in each of the polymer strips is shown in Table 6 below:

TABLE 6

Monthly Analysis Polymer Adsorption Study

| | Stationary | | | Mobile | | |
|---|---|---|---|---|---|---|
| | 1 month | 2 month | 3 month | 1 month | 2 month | 3 month |
| ECTFE | 3.2% | 3.3% | 4.5% | 4.3% | 3.2% | 4.9% |
| ESD100 | 6.2% | 10.7% | 9.1% | 6.8% | 13.0% | 11.5% |
| FEP | 1.7% | 3.6% | 2.6% | 1.8% | 3.0% | 1.8% |
| Nylon 11 | 4.0% | 5.0% | 6.2% | 4.8% | 4.7% | 7.6% |
| PA66 | 3.5% | 3.9% | 3.1% | 3.3% | 3.6% | 2.9% |
| PE | * | 10.9% | 10.0% | 6.6% | 8.2% | 7.7% |
| PFA | 2.0% | 3.5% | 1.9% | 2.1% | 3.1% | 1.7% |
| PVDF | 3.1% | 4.5% | 2.9% | 3.1% | 3.7% | 3.0% |
| TPX | 4.4% | 6.1% | 6.2% | 4.7% | 7.5% | 7.7% |

TABLE 6-continued

Monthly Analysis Polymer Adsorption Study

| | Stationary | | | Mobile | | |
|---|---|---|---|---|---|---|
| | 1 month | 2 month | 3 month | 1 month | 2 month | 3 month |
| PTFE | 2.7% | 3.7% | 3.0% | 2.8% | 3.7% | 3.6% |
| PVC | 7.9% | 4.4% | 4.4% | 5.1% | 4.0% | 5.2% |

* samples were lost during the extraction process

As can be seen from the study results above, there does not seem to be a large statistical difference between the mobile and stationary polymer studies. This leads to the conclusion that the removal of the PCBs may require an additional driving force, something to impart a motivating factor to cross the polymeric lattice.

10. Ethanol-Containing Interior for Polymer Blanket

The data obtained from previous studies has shown that while PCBs were being transported away from the sediment by the various polymers, there did not seem to be a great deal of difference between the various types of polymeric materials. It was decided to try testing a sediment study in which an ethanol interior was included within the polymer, in hopes of introducing a concentration gradient effect to increase the transport of the PCBs through the polymeric material. This was accomplished by using polyethylene pipette bulbs filled with ethanol and placed in the contaminated sediments. The pipette bulbs were each filled with 4 mL of 1% acidified ethanol (i.e., 1% acetic acid in ethanol), and half of the bulbs had ~0.25 g of zero-valent magnesium added and the rest had no magnesium added.

Magnesium (~4 µm) was obtained from Hart Metals, Inc. (Tamaqua, Pa.). All metals and catalysts listed above were used as received.

This study was run for a total of 3 months, with samples extracted and analyzed each month. The results are shown below in Table 7:

TABLE 7

Analysis after 3 Months of Study with ethanol interior

| 1 month | | 2 month | | 3 month | |
|---|---|---|---|---|---|
| Mg | no Mg | Mg | no Mg | Mg | no Mg |
| 38% | 41% | 44% | 49% | * | 53% |

The data clearly shows a sharp increase in the PCBs found within the interior of the pipette bulb (even within the $1^{st}$ month) which seems to validate the hypothesis that the ethanol interior plays an important role in establishing a concentration gradient which drives the transport of PCBs across the polymer membrane. However, the inclusion of zero-valent magnesium did not seem to show a significant increase in the sorption rate as had been hoped (due to the possible increase in the concentration gradient as the incoming PCBs were degraded continuously by the active zero-valent metal). It is possible that the addition of more acetic acid may help "jump-start" the process, as it is possible that by the time the PCBs have crossed the polymer membrane the acid may have been used up and the surface of the metal may be oxidized. Additionally, it was noticed at the time of sampling that the level of the ethanol had decreased in each of the pipette bulbs due to evaporation, which raised concerns that the PCBs may have been rinsed free of the sediments and the sorption rates falsely raised for these studies.

The original pipette bulb study was repeated. However the pipette bulbs were covered with parafilm to prevent the acidified ethanol from evaporating into the sealed headspace of the experimental vial. In addition, zero-valent magnesium was not used (due to the negligible difference between the samples seen in the previous studies) and the time frame was shortened to a single month. As can be seen in Table 8, the ethanol interior does seem to have a significant impact on the PCB transport across the membrane, as the results mirrored the previous study.

TABLE 8

Repeat of 1-Month Adsorption Study with sealed pipette tips

| A | B | C | D |
|---|---|---|---|
| 47% | 46% | 49% | 45% |

Within a single month, it appeared that ~50% of the PCBs had been extracted from the sediments. This was calculated by analyzing the pipette bulb+interior as well as the sediment itself to account for all the PCBs (or as much as possible).

11. Large Scale Laboratory Test

A large scale laboratory test was setup to demonstrate the feasibility of using multiple pipette tips attached to a solvent reservoir for the removal of PCBs from contaminated sediment. These pipette tips are made from the same type of polymer as the pipette bulbs used in the previous studies, however they are much thicker and sturdier, and therefore more likely to be usable as a deployable technology in the field. A large amount of contaminated sediments was prepared at a concentration of ~100 ppm Aroclor 1254 and placed in a 2 L beaker. The test system was built using a 6" diameter Teflon rod, which was hollowed out to an internal volume of ~100 mL. Six 10 mL Eppendorf pipettes were attached to the underside of the Teflon reservoir disk by tapping the Teflon disk and threading the exterior ends of the pipette tips, and the ends of the pipettes were sealed. The reservoir and pipettes were filled with 1% acetic acid in ethanol and placed (tips down) into the beaker containing the contaminated sediment. The test system was allowed to stay in place ~1 month prior to sampling. At the end of one month, the test device was removed from the sediment and the interior ethanol was removed for analysis. Unfortunately, there was apparently some leakage occurring in the seal between the two Teflon disks, which caused the additional ethanol/acetic acid in the reservoir itself to escape into the sediments during the 1 month tests. This was not noticed because the ethanol/acetic acid levels in the pipette tips (which was visible during testing) did not decrease over the month long period, due to the fact that the leak occurred above the pipettes.

12. Additional Laboratory Testing

Recent sediment studies were conducted to compare two different types of coated polypropylene using dichloromethyoctylsilane (DCMO) and Heptadecafluoro-1,1,2,2-tetrahydrodocyltrietyoxysilane (HDFTHT). The outside of the bulbs were coated with a thin layer of each of the polymers, and the experiment was set up in duplicate. 4 mL of 1% acetic acid-ethanol solution was placed in the pipet bulbs, and the bulbs were placed in ~10 grams of PCB-spiked sediments. After approximately 3 weeks, the samples were extracted similarly to previous experiments. The interior solvent was extracted using 5 mL of toluene, and the pipet bulb was extracted separately using 10 mL of toluene. The extracts were sonicated and an aliquot was analyzed via GC-ECD for quantification. As controls, non-modified pipet bulbs were also analyzed in the same manner; these were not coated with any polymer and acted as control samples to gauge the effect the individual polymer coatings had on the transport of the PCBs across the polymer membrane. The data from these experiments is given in Table 9 below:

TABLE 9

| | Interior | Bulb | Total Removed (µg PCBs) |
|---|---|---|---|
| dichloromethyloctyl silane | | | |
| 1 | 40.08 | 22.03 | 62.11 |
| 2 | 44.52 | 22.96 | 67.48 |
| heptadecafluoro-1,1,2,2-tetrahydrodecyltriethoxy silane | | | |
| 1 | 51.26 | 36.91 | 88.17 |
| 2 | 37.34 | 18.32 | 55.66 |
| Control | | | |
| pipet 1 | 70.69 | 27.85 | 98.54 |
| pipet 2 | 63.39 | 22.01 | 85.40 |
| pipet 3 | 71.83 | 23.96 | 95.79 |
| pipet 4 | 83.84 | 35.22 | 119.06 |

The data show that both of the coatings (DCMO and HDFTHT) seemed to inhibit the transport of PCBs into the polypropylene relative to the unaltered control pipets, which showed ~30%-35% greater total removal. One item to note is that the concentration of PCBs in the interior solvent of all three sample types (control, DCMO, and HDFTHT) are very similar, indicating that polymer coatings are simply inhibiting the contaminants from entering the polymer membrane. Once the PCBs are in the membrane itself, transport to the interior is a function of the equilibrium process between the polypropylene and the ethanol solvent.

A second study that was undertaken compared the effectiveness of latex, polystyrene, and Styrofoam to remove PCBs from contaminated sediments. Latex was obtained from non-powdered latex gloves, while polystyrene/Styrofoam were procured from store-bought cups. ~1 cm coupons were cut out of the cups for the study, while a similar amount of surface area was used from the fingertips of the latex gloves. The coupons were placed in ~10 g of spiked sediments and allowed to sit for ~1 month. The samples were then extracted with a modified extraction process; hexane was used as the extraction due to the solubility of the various polymers in hexanes.

TABLE 10

| Sample ID | Total Removed (µg PCBs) |
|---|---|
| latex 1 | 268.2 |
| latex 2 | 225.2 |
| polystyrene a | 22.9 |
| polystyrene b | 23.1 |
| polystyrene c | 25.8 |

TABLE 10-continued

| Sample ID | Total Removed (µg PCBs) |
|---|---|
| styrofoam d | 18.2 |
| styrofoam e | 27.8 |
| styrofoam f | 21.1 |

The latex polymer was the most effective for PCB sorption from the contaminated sediments by a large margin. Further studies will be performed in the future based off of these results.

A more complete sediment study of newly obtained polymers was initiated to determine the different sorption capabilities of materials such as norprene, acetonitrile butadiene styrene, nitrile, viton, gum rubber (isoprene), and butyl rubber. The sediment study was setup similar to previous studies of this type. ~10 g of dried, sieved sediments was placed in a 20 mL vial, and each individual vial was spiked with a total of 600 µg of Aroclor 1254. This was accomplished by adding 3 mL of a 200 ppm Aroclor 1254 solution to the sediment (bringing the samples to incipient wetness) and allowing the solvent to evaporate overnight. Once the sediments were dry, multiple sample vials containing the polymers being tested were setup. For polymers received as tubing, ~1 cm length pieces were used for each sample. For samples received as a film/roll, pieces ~1 cm$^2$ in area were used. All polymer samples were submerged within the spiked sediments, and then brought to incipient wetness (to simulate sediment conditions) by adding 3 mL water. The samples were then capped and allowed to sit/interact for a certain period of time before being extracted and analyzed. Duplicate samples were pulled for analysis after 3, 7, and 17 weeks. Samples were extracted as in the last study, where the polymer itself was extracted using a total volume 10 mL of hexane followed by application of ultrasound. The extract was then analyzed using GC-ECD (with standards run to confirm concentrations). The concentration within each extract was then back-calculated to a total mass of Aroclor 1254 removed by each polymer (for comparison purposes to the original spike concentration of 600 µg). This data is shown in the table below:

TABLE 11

| | PCB Removal | | |
|---|---|---|---|
| Sample ID | 3 Weeks | 7 Weeks | 17 Weeks |
| Black Norprene Tubing | 5.73% | 7.96% | 10.63% |
| White Norprene Tubing | 2.15% | 4.54% | 4.60% |
| Latex Glove | 0.93% | 3.14% | 4.14% |
| Thick Nitrile Glove | 0.95% | 0.31% | 1.59% |
| Abrasion Resistant Gum Rubber (5/8") | 1.03% | 3.43% | 1.86% |
| Natural Gum Foam | 3.04% | 14.17% | 20.26% |
| Abrasian Resistant Gum Rubber (1/16") | 3.02% | 5.42% | 8.27% |
| Weather Resistant Butyl Rubber | 3.44% | 7.14% | 18.46% |
| Weather Resistant Butyl Rubber | 3.85% | 9.02% | 9.87% |
| Viton Mat | 4.22% | 7.30% | 6.03% |
| Black Viton Tubing | 1.89% | 0.94% | 2.76% |
| White Viton Tubing | 0.99% | 0.63% | 0.91% |
| Butyl Rubber (glove) | 3.99% | 3.48% | 4.10% |
| ABS | 2.95% | 4.71% | 3.89% |

As can be seen from the data, the best performing polymers (after 17 weeks) were the natural gum foam rubber, the black norprene tubing, the abrasian resistant gum rubber (1/16"), and the weather resistant butyl rubber. These samples showed the highest removal capabilities as well as the highest increases (between sampling periods) during the study. A second companion study was run concurrently with this one to measure the affect a protonated solvent (ethanol) would have on the removal capability of the polymers. Previous studies have shown this to have a capability of increasing the removal capabilities of the polymeric material, most likely due to a concentration gradient effect created by having an ethanol interior and the possible opening of the polymeric lattice to allow greater transport. For this study, the Thick Nitrile gloves were chosen due to convenience factors. It was relatively simple to use the finger tips of the glove as a natural reservoir for the ethanol (it was more difficult to achieve this with film/tubing). Approximately a 1.5" section of the finger tip was used for each sample, and 5 mL of ethanol was added. The glove tip was then sealed (using zip-ties) and submerged within dried, spiked sediment (prepared the same as the previous study), and the sediments were brought to incipient wetness. Duplicate samples were pulled and analyzed at the 3 week and 7 week marks. The ethanol interior was removed from the nitrile glove material; the nitrile polymer and the ethanol interior were analyzed separately. The nitrile glove material was extracted as in the previous study, using 10 mL of hexane and ultrasound. The ethanol interior was extracted using 5 mL of hexane and ultrasound. Both samples were then analyzed using GC-ECD (run with standards). The data from this study is summarized in the following table:

TABLE 12

| | % PCB Removal | |
|---|---|---|
| Sample ID | 3 Weeks | 7 Weeks |
| Thick Nitrile Glove (w/EtOH) | 19.19% | 66.13% |
| Ethanol Interior | 4.99% | 2.47% |
| Thick Nitrile Glove (w/EtOH) | 24.18% | 68.61% |
| Thick Nitrile Glove (w/EtOH) | 19.42% | 70.13% |
| Ethanol Interior | 4.34% | 2.49% |
| EtOH Interior + Glove | 23.76% | 72.62% |

Again, the data is presented as % removal of PCBs as compared to the original 600 µg of Aroclor 1254 that was used to spike each sample vial. The data shows that PCBs are transporting across the polymer to the interior, although the concentration found there is not extremely high, nor does it vary much between the 3 and 7 week period. However, the nitrile polymer itself shows a higher removal rate (compared to other polymer, as well as nitrile without an ethanol interior) which indicates that the interior is increasing the removal rate/capacity. At the 3 week mark, ~20% of all PCBs were found within the nitrile glove tip (~120 µg Aroclor 1254) and at the 7 week mark the removal had increased to ~68% (~410 µg Aroclor 1254). The duplicates were in good agreement with one another. It is possible that ethanol was leaching through the nitrile glove material and into the sediment, which may have falsely inflated the PCB removal numbers (by helping remove the PCBs from the sediments). It appeared that both samples were intact, and that most (if not all) of the ethanol was still within the glove material (an exact volume was not determined). Further studies will have to be performed to investigate this possibility. Previous studies have shown that ethanol interiors can provide a marked increase in removal capacity. This would argue for the fact that at least some of the increased removal is due to ethanol interior. Perhaps the most salient point to note from the data presented in the last two studies is that the total percent of PCB removed was greater through the use of an ethanol interior. The nitrile glove material alone performed more poorly than some of the other polymers that were tested (such as the natural gum foam and weather resistant butyl rubber).

If these other polymers can be combined with an ethanol interior, we believe the same sort of increase will occur in the PCB removal capacity of the materials.

Figure 1:
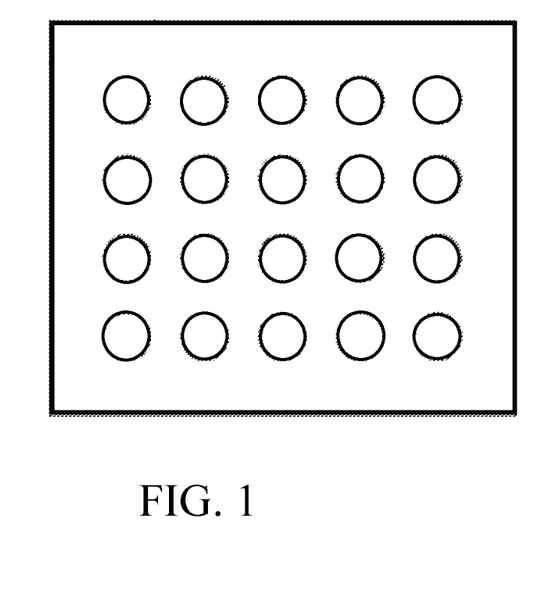
FIG. 1 depicts a top view of the polymer blanket in accordance with one embodiment of the invention.
Figure 2:
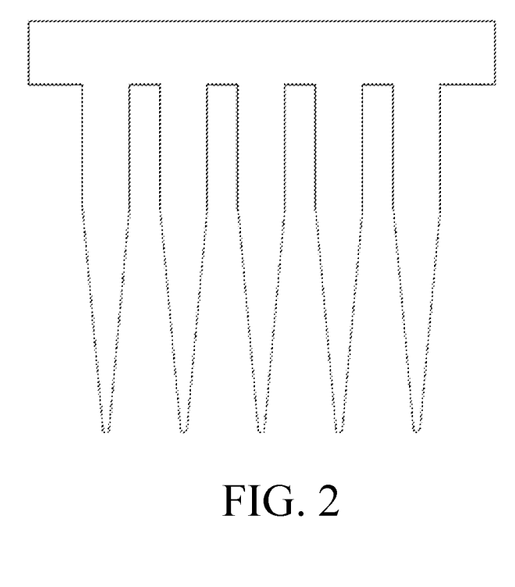
FIG. 2 depicts a side view of the polymer blanket in accordance with one embodiment of the invention.

One embodiment of the polymer blanket that may be used in accordance with the present invention is shown in FIG. 1 (top view) and FIG. 2 (side view).

Although the present invention has been disclosed in terms of a preferred embodiment, it will be understood that numerous additional modifications and variations could be made thereto without departing from the scope of the invention as defined by the following claims.

We claim:

1. A treatment system for the removal of at least one halogenated compound comprising:
    a polymer blanket formed from a polymer which provides for the permeation of at least one halogenated compound into and/or through a wall of said polymer blanket; and
    at least one non-polar solvent received by said polymer blanket, wherein said non-polar solvent solubilizes at least one halogenated compound that permeates into and/or through said polymer blanket.

2. The treatment system of claim 1 wherein said polymer is an amphiphilic polymer.

3. The treatment system of claim 2 wherein said amphiphilic polymer is selected from the group consisting of as polylactic acid (PLA), polytheylenimine (PEI), and mixtures thereof.

4. The treatment system of claim 1 wherein said polymer is selected from the group consisting of tear-resistant polytetrafluoro-ethylene (PTF), polyvinylchloride (PVC), perfluoroalkoxy (PFA), polyvinylidene fluoride (PVDF), ethylene chlorotrifluoroethylene (ECTFE), polyimides, attapulgite, thermoplastic polyurethanes, Polyamide 66, polystyrene, polyethylene (PE), polypropylene, Nylon 11, polymethylpentene (PMP), fluoroethylene propylene (FEP), propylene-ethylene copolymers, conductive polymers, Nylon 12, polydimethylsiloxane, liquid crystal polymers, natural rubbers, nitriles and mixtures thereof.

5. The treatment system of claim 4 wherein said polymer is a natural rubber or a nitrile.

6. The treatment system of claim 1 wherein said at least one non-polar solvent is at least one alcohol.

7. The treatment system of claim 6 wherein said at least one alcohol is selected from the group consisting of ethanol, methanol, octanol, propanol, butanol, and mixtures thereof.

8. The treatment system of claim 7 wherein said at least one alcohol is ethanol.

9. The treatment system of claim 8 wherein said ethanol is acidified with an acidifying agent.

10. The treatment system of claim 9 wherein said acidifying agent is glacial acetic acid.

11. The treatment system of claim 6 wherein said at least one non-polar solvent includes at least one alcohol that is acidified with an acidifying agent.

12. The treatment system of claim 1 wherein said at least one halogenated compound is a polychlorinated biphenyl (PCB).

13. The treatment system of claim 1 wherein said polymer blanket includes a hollow interior for receiving and containing said at least one non-polar solvent.

14. The treatment system of claim 1 wherein said polymer blanket receives and contains said at least one non-polar solvent within a wall of the polymer blanket.

* * * * *